(12) United States Patent
Shibata et al.

(10) Patent No.: US 9,511,718 B2
(45) Date of Patent: Dec. 6, 2016

(54) GLOVE BOX

(71) Applicants: TOYODA GOSEI CO., LTD., Kiyosu-shi, Aichi (JP); TOYOTA JIDOSHA KABUSHIKI KAISHA, Toyota-shi, Aichi (JP)

(72) Inventors: Minoru Shibata, Nagoya (JP); Kenji Asano, Aisai (JP); Kazutomo Kajiwara, Nagoya (JP); Akihiro Deshimaru, Miyoshi (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/897,249

(22) PCT Filed: Jul. 4, 2014

(86) PCT No.: PCT/JP2014/003574
§ 371 (c)(1),
(2) Date: Dec. 10, 2015

(87) PCT Pub. No.: WO2015/015713
PCT Pub. Date: Feb. 5, 2015

(65) Prior Publication Data
US 2016/0137137 A1    May 19, 2016

(30) Foreign Application Priority Data

Jul. 31, 2013   (JP) .................. 2013-159468

(51) Int. Cl.
*B60R 7/06* (2006.01)

(52) U.S. Cl.
CPC .................. *B60R 7/06* (2013.01)

(58) Field of Classification Search
CPC ........................................ B60R 7/06
(Continued)

(56) References Cited

U.S. PATENT DOCUMENTS

| 4,630,857 A |   | 12/1986 | Zweiniger et al. |
| 5,383,628 A | * | 1/1995 | Harriehausen ....... B64D 11/003 |
|  |  |  | 244/118.1 |

(Continued)

FOREIGN PATENT DOCUMENTS

| GB | 2522837 A | * | 8/2015 |
| JP | 61-139538 A |   | 6/1986 |

(Continued)

OTHER PUBLICATIONS

International Search Report of the International Searching Authority dated Sep. 22, 2014 for the corresponding International application No. PCT/JP2014/003574 (and English translation).

*Primary Examiner* — Jason S Morrow
(74) *Attorney, Agent, or Firm* — Posz Law Group, PLC

(57) ABSTRACT

To provide a glove box that can cause an inner case to operate to open obliquely downward while suppressing large change in the center of gravity in the up-down direction. A mechanism for guiding opening/closing operation of the inner case in the glove box is composed of two types of mechanisms: i.e., a slide mechanism including a guide shaft and a slide guide portion; and a link mechanism including a link member. The inner case is guided in the front-rear direction by the slide mechanism, and a rear portion of the inner case is guided so as to swing downward by the link mechanism.

7 Claims, 10 Drawing Sheets

(58) Field of Classification Search
USPC .......................... 296/24.34, 37.12; 312/325
See application file for complete search history.

(56) References Cited

U.S. PATENT DOCUMENTS

| | | | | |
|---|---|---|---|---|
| 5,800,005 | A * | 9/1998 | Arold | B60N 3/102 |
| | | | | 296/37.12 |
| 8,393,663 | B2 * | 3/2013 | Gayon | B60R 7/06 |
| | | | | 296/37.12 |
| 8,668,239 | B2 * | 3/2014 | Doll | B60R 7/04 |
| | | | | 296/37.12 |
| 2006/0132007 | A1 * | 6/2006 | Beckley | B60R 7/04 |
| | | | | 312/325 |
| 2007/0069543 | A1 * | 3/2007 | Stoof | B60R 7/06 |
| | | | | 296/37.8 |
| 2007/0119852 | A1 * | 5/2007 | Matsunaga | B60R 7/06 |
| | | | | 220/200 |
| 2010/0148531 | A1 | 6/2010 | Evans et al. | |
| 2013/0154297 | A1 * | 6/2013 | Doll | B60R 7/04 |
| | | | | 296/37.8 |
| 2014/0110962 | A1 * | 4/2014 | Bohnenberger | B60R 7/06 |
| | | | | 296/37.12 |
| 2016/0069412 | A1 * | 3/2016 | Jeon et al. | B60R 7/06 |
| | | | | 74/411.5 |

FOREIGN PATENT DOCUMENTS

| | | | |
|---|---|---|---|
| JP | 5085269 | A * | 4/1993 |
| JP | 09-317316 | A | 12/1997 |
| JP | 2003-161073 | A | 6/2003 |
| JP | 2007-290459 | A | 11/2007 |
| JP | 2008-149781 | A | 7/2008 |
| JP | 2008-184118 | A | 8/2008 |
| JP | 2009-132264 | A | 6/2009 |

* cited by examiner

GLOVE BOX

CROSS REFERENCE TO RELATED APPLICATIONS

This application is a U.S. national stage application of PCT/JP2014/003574 filed on Jul. 4, 2014, which claims priority to Japanese Patent Application No. 2013-159468 filed on Jul. 31, 2013, the contents of which are incorporated herein by reference.

TECHNICAL FIELD

The present invention relates to an in-vehicle glove box.

BACKGROUND ART

As a glove box provided in an instrument panel of a vehicle, a rotary type and a pull-out type are known.

A general glove box includes an outer case and an inner case. The outer case can accommodate the inner case, and the inner case has formed therein a storage space capable of accommodating various types of belongings therein. The storage space of the inner case is open upward and the outer case is provided with an opening which serves as an entry hole to the inner case (hereinafter, simply referred to as entry hole). The inner case rotates or slides relative to the outer case from the front side, i.e., from the inside of the outer case, through the entry hole of the outer case, to the rear side, i.e., to the outside of the outer case (further in other words, to the inward side of the vehicle's cabin), to be pulled out. Therefore, the position of the inner case is changed between a closed position at which the entry hole of the outer case is closed and an open position at which the entry hole is open and at least a part of the storage space is exposed to the rear side (in the vehicle's cabin) (for example, see Patent Literature 1). It should be noted that the front side herein refers to the leading side of the vehicle's traveling direction, and the rear side refers to the rear side of the vehicle's traveling direction.

Meanwhile, in recent years, there are many cases where a lower part of the instrument panel of a vehicle is made inclined from the front and lower side toward the rear and upper side. The rear face of the inner case is often designed so as to be flush with the instrument panel. When the inclination angle of the instrument panel is large, the rear face of the inner case is also inclined to a great extent. In this case, in order to cause the storage space of the inner case to be sufficiently exposed in the vehicle's cabin so that a passenger can easily put articles into and out of the inner case, the rotation angle of the inner case needs to be made large or the sliding amount of the inner case needs to be made large. However, for example, if the rotation angle of the inner case is made large, there is a risk that the inner case is greatly inclined rearward at the open position, causing the articles in the storage space to jump out into the vehicle's cabin. Moreover, if the sliding amount of the inner case is made large, the inner case greatly projects into the vehicle's cabin at the open position, and thus, the passenger may feel uncomfortable.

It is considered that, if the inner case is pulled out obliquely downward, the above-described problem that the articles in the storage space jump out during the opening operation of the inner case, and the problem that the storage space of the inner case is not sufficiently exposed in the vehicle's cabin are less likely to occur. For example, if a known slide rail mechanism and a known link mechanism are used, the sliding direction of the inner case can be guided obliquely downward. However, in a case where the inner case is guided obliquely downward only by means of the slide rail mechanism and the link mechanism, the center of gravity of the inner case greatly changes. In particular, there is a problem that, when the center of gravity greatly changes in the up-down direction, the operation of opening/closing the inner case requires a comparatively large force.

CITATION LIST

Patent Literature

Patent Literature 1: Japanese Laid-Open Patent Publication No. H09-317316

SUMMARY OF THE INVENTION

Technical Problem

The present invention has been made in view of the above situations. An object of the present invention is to provide a glove box that can cause the inner case to operate to open obliquely downward while suppressing large change in the center of gravity in the up-down direction.

Solution to Problem

A glove box of the present invention solving the problem described above includes:
an outer case in a box shape having an entry hole which is open rearward;
an inner case having therein a storage space which is open upward, the inner case configured to slide and swing between a closed position at which the inner case is accommodated in the outer case to close the entry hole, and an open position at which at least a part of the inner case is pulled out through the entry hole of the outer case to a rear and lower side relative to the outer case to open the entry hole;
a guide shaft provided in the inner case;
a slide guide portion provided in the outer case and configured to slidably and rotatably support the guide shaft to guide the inner case at least in a front-rear direction; and
a link member including a first link shaft axially supported by the outer case and a second link shaft axially supported by the inner case, the link member connecting the outer case and the inner case, and in the glove box,
the guide shaft is provided in a front portion of the inner case, the first link shaft is provided in the outer case above the inner case, and the second link shaft is provided in a rear portion of the inner case.

Preferably, the glove box of the present invention includes any one of (1) to (6) below, and more preferably, includes a plurality of (1) to (6).

(1) The outer case includes a communication hole which is open forward,
the second link shaft is axially supported by the inner case so as to be detachable therefrom, and
when the inner case is detached from the second link shaft at the open position, the inner case becomes rotatable about an opening rotation shaft provided in a front and lower portion of the inner case.

(2) A position of the guide shaft relative to the inner case is further to a front side relative to a front-side ¼ position of the inner case.

(3) A position of the second link shaft relative to the inner case is to a rear side relative to a front-side ⅓ position of the inner case.

(4) A position of the guide shaft relative to the inner case is further to a lower side relative to a lower-side ¼ position of the inner case.

(5) The opening rotation shaft is the guide shaft.

(6) The inner case includes the opening rotation shaft further to a lower side relative to a lower-side ¼ position of the inner case, the outer case includes a pivot portion capable of coming into contact with the opening rotation shaft and configured to pivotally support the opening rotation shaft at the open position, and at the open position, the inner case rotates about the opening rotation shaft pivotally supported by the pivot portion.

Advantageous Effects of Invention

In the glove box of the present invention, as a mechanism for guiding opening/closing operation of the inner case, two types of mechanisms, i.e., a mechanism including the guide shaft and the slide guide portion (referred to as slide mechanism) and a mechanism including the link member (referred to as link mechanism) are used. Then, the inner case is guided in the front-rear direction by the slide mechanism, and a rear portion of the inner case is guided so as to swing in the up-down direction by the link mechanism. If the rear portion (that is, a portion located on the inward side of the vehicle's cabin in the inner case) of the inner case is caused to swing downward, the opening of the inner case can be lowered without moving the entirety of the inner case downward, and thus, the storage space can be sufficiently exposed in the vehicle's cabin. Thus, the slide mechanism need not cause the inner case to move downward. That is, the inner case operates to open substantially obliquely downward, but the moving amount in the up-down direction of the inner case itself is small.

Thus, in the glove box of the present invention, the inner case is guided in the front-rear direction by the slide mechanism, and the rear portion of the inner case is caused to swing downward by the link mechanism, whereby the inner case is caused to operate to open obliquely downward. Accordingly, compared with a case where the entirety of the inner case is caused to slide obliquely downward, or a case where the inner case is caused to greatly swing, the amount of change in the center of gravity of the inner case in the up-down direction can be reduced. Further, in the glove box of the present invention, the supporting point (guide shaft) in the slide mechanism and the supporting points (second link shaft in particular) in the link mechanism are distanced from each other in the front-rear direction of the inner case. This also allows the inner case to operate to open in a stable manner.

Meanwhile, when performing maintenance, inspection, or the like of a vehicle, depending on the positional relationship between a vehicle component and an interior part to be subjected to the maintenance or the like, there are cases where the interior part needs to be dismounted so as to expose the vehicle component. For example, to the front side (farther side of the instrument panel) of the glove box which is a type of such interior parts, an air conditioner which is a type of the vehicle components is provided in general. In this case, for example, in order to replace the filter of the air conditioner, at least the inner case of the glove box needs to be dismounted. However, in a general glove box, the inner case is assembled in the outer case and/or the instrument panel so as not to be easily detached therefrom. Thus, the work of dismounting the inner case from the outer case and/or the instrument panel is complicated. In such circumstances, there is a demand for a glove box that can cause a vehicle component located to the front side of the inner case to be easily exposed, without dismounting the inner case from the outer case and the instrument panel. In the glove box of the present invention provided with (1) described above, by causing the inner case to be detached from the connection portion (that is, the second link shaft) between the link mechanism and the inner case at the open position, the inner case becomes rotatable relative to the outer case and the instrument panel. The inner case rotates about the opening rotation shaft provided in a front and lower portion of the inner case. Accordingly, a space is formed above the inner case and the inside of the outer case is exposed. In addition, the outer case includes a communication hole which is open to the front side. Through this communication hole, the vehicle component is exposed. Thus, according to the glove box of the present invention, the vehicle component can be exposed without dismounting the inner case. Thus, replacement of the filter of the air conditioner or the like can be easily performed.

DESCRIPTION OF EMBODIMENTS

Hereinafter, a glove box of the present invention will be specifically described.

Embodiment 1

Figure 1:
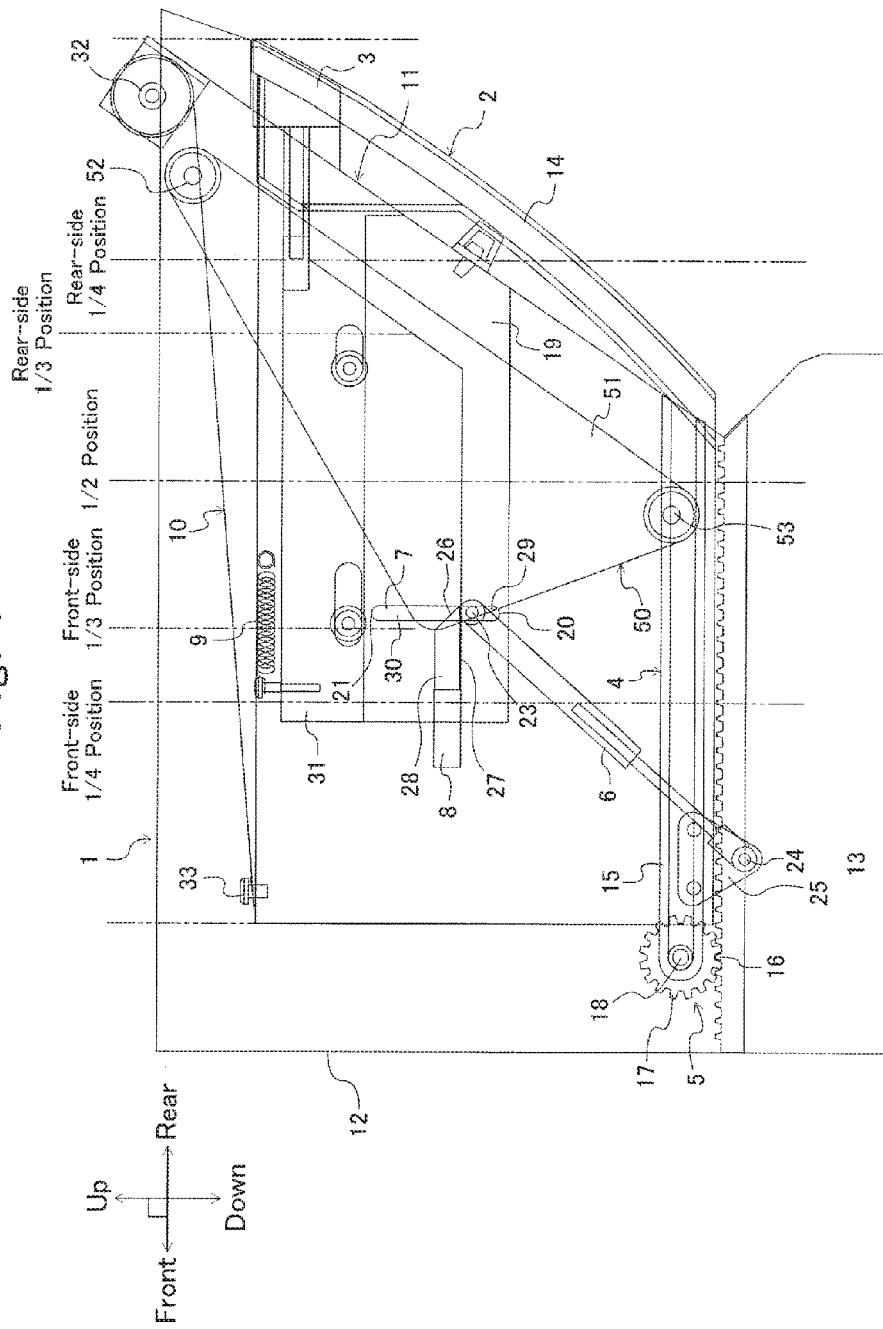
FIG. 1 is an explanatory drawing schematically showing a glove box of Embodiment 1 with an inner case at a closed position.
Figure 2:
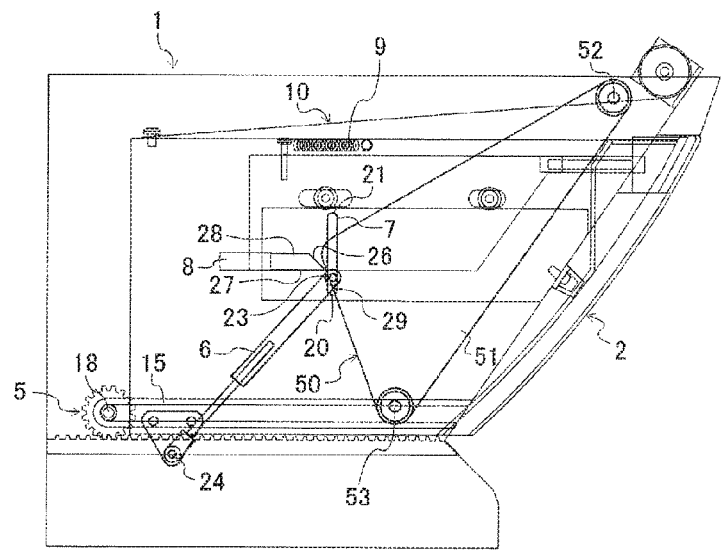
FIG. 2 is an explanatory drawing schematically showing the glove box of Embodiment 1 with the inner case at the closed position and with a lock body at a release position during opening operation.
Figure 3:
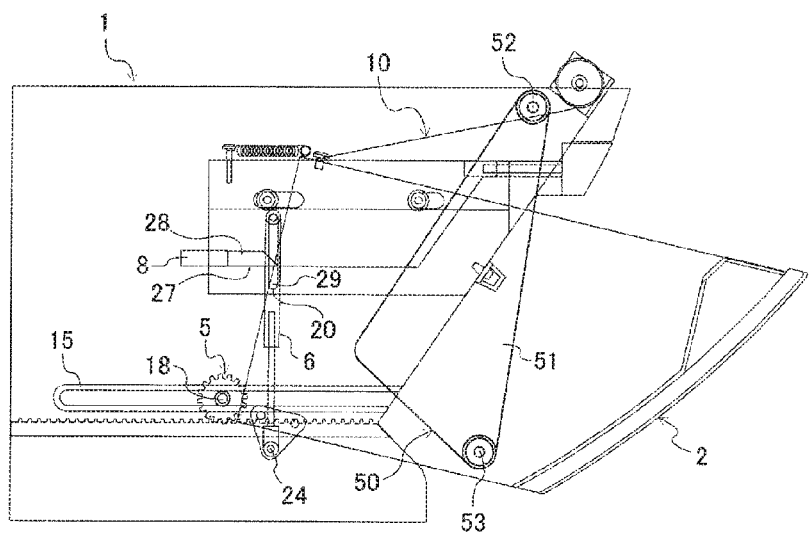
FIG. 3 is an explanatory drawing schematically showing the glove box of Embodiment 1 with the inner case at a half-open position during opening operation.
Figure 4:
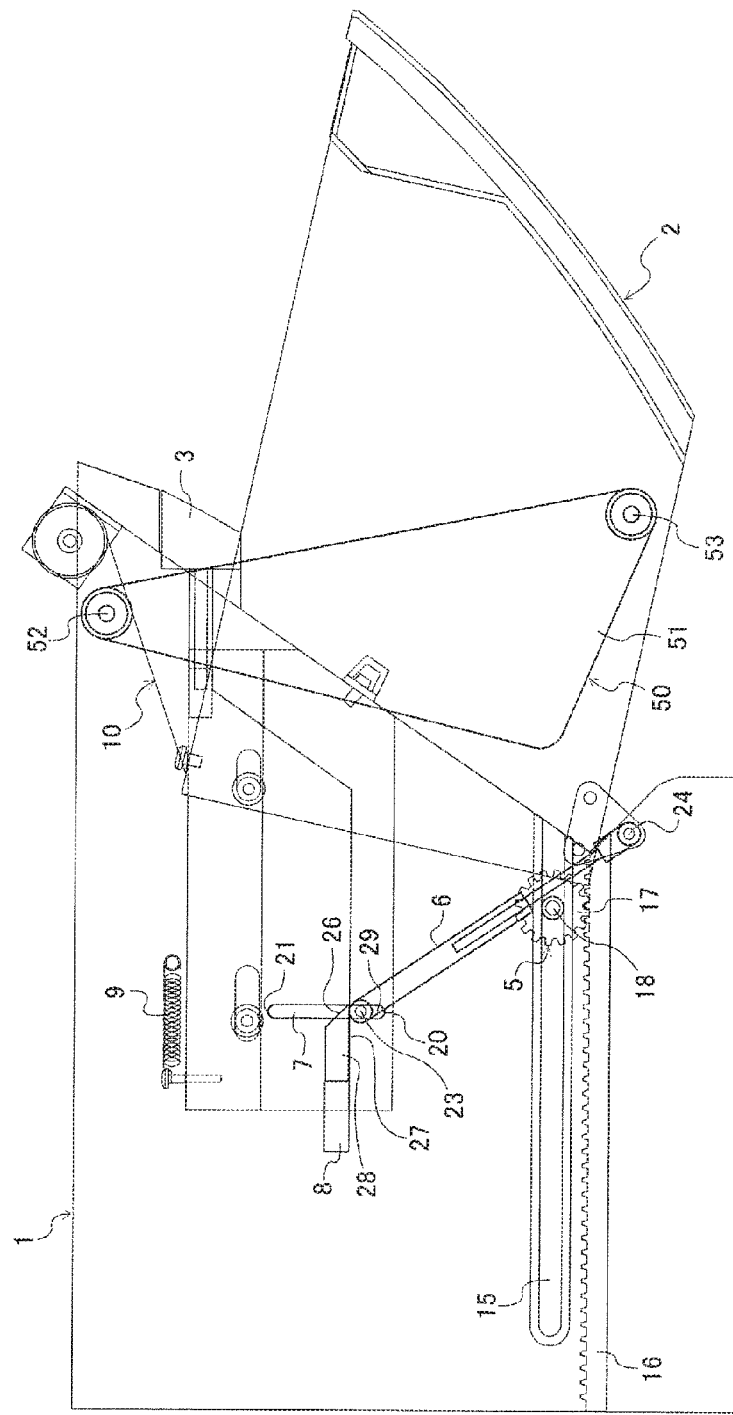
FIG. 4 is an explanatory drawing schematically showing the glove box of Embodiment 1 with the inner case at an open position.
Figure 5:
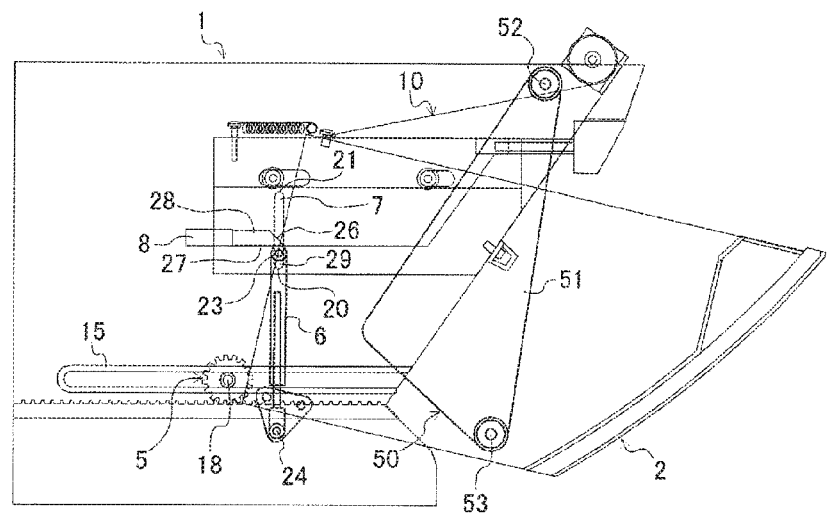
FIG. 5 is an explanatory drawing schematically showing the glove box of Embodiment 1 with the inner case at the half-open position during closing operation.
Figure 6:
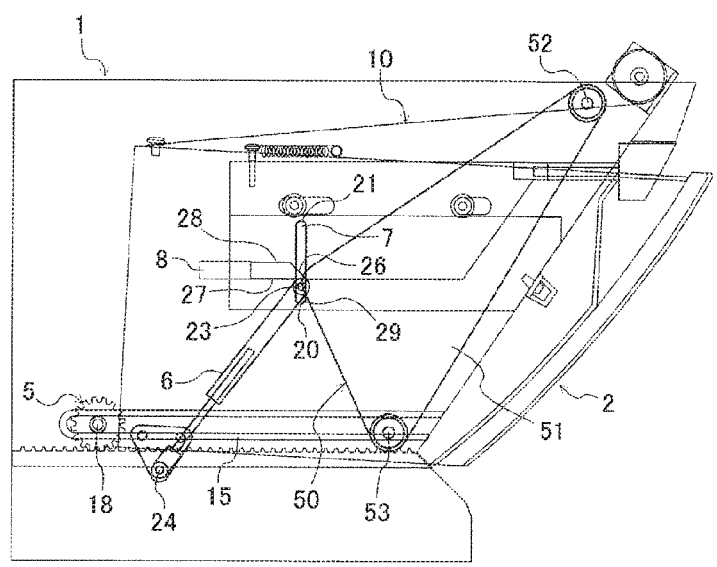
FIG. 6 is an explanatory drawing schematically showing the glove box of Embodiment 1 with the inner case at a position between the half-open position and the closed position during closing operation.

FIG. 1 to FIG. 6 are each an explanatory drawing schematically showing a glove box of Embodiment 1. Specifically, FIG. 1 shows the glove box with an inner case at a closed position. FIG. 2 shows the glove box with the inner case at the closed position and with a lock body at a release position during opening operation. FIG. 3 shows the glove box with the inner case at a half-open position during opening operation, and FIG. 4 shows the glove box with the inner case at an open position. FIG. 5 shows the glove box with the inner case at the half-open position during closing operation, FIG. 6 shows the glove box with the inner case at a position between the half-open position and the closed position during closing operation. Hereinafter, in Embodiment 1, "up", "down", "front", and "rear" respectively refer to "up", "down", "front" and "rear" in FIG. 1. It should be noted that "front" corresponds to the leading side of the vehicle's traveling direction. "Rear" corresponds to the rear side of the vehicle's traveling direction, that is, the inward side of the vehicle's cabin.

As shown in FIG. 1, the glove box of Embodiment 1 includes an outer case 1, an inner case 2, a closing lock element (not shown), an operation end portion 3, a first guide member 4, a second guide member 5, an open/close urging element 6, an open/close guide portion 7, a lock body 8, a lock urging element 9, a constant force spring 10, and a link member 50.

The outer case 1 is assembled in an instrument panel (not shown) of an automobile. Specifically, the outer case 1 has a box shape having an entry hole 11. In the outer case 1, the entry hole 11 faces the design face (the rear face, the face exposed in the vehicle's cabin) of the instrument panel, a lateral bottom portion 12 opposed to the entry hole 11 faces the farther side (the front side, the leading side of the vehicle's traveling direction) of the instrument panel, and a lower bottom portion 13 faces downward. In Embodiment 1, the outer case 1 is a separate body from the instrument panel, and is assembled in the instrument panel. However, it is sufficient that the outer case 1 can accommodate the inner case 2 therein, and is not limited to this shape. For example, at least a part of the outer case 1 may be formed with a vehicle component member such as the instrument panel or the like. Further, the outer case 1 may include an opening other than the entry hole 11.

The inner case 2 has a box shape capable of being accommodated inside the outer case 1. The position of the inner case 2 can be changed between the closed position shown in FIG. 1 and the open position shown in FIG. 4, by being guided by the first guide member 4 and the second guide member 5 described later. Specifically, the first guide member 4 and the second guide member 5 guide the sliding direction of the inner case 2. A front wall 14 of the inner case 2 is flush with the instrument panel not shown at the closed position.

The closing lock element has a known lock structure, and can be driven by the operation end portion 3. More specifically, the closing lock element (not shown) in Embodiment 1 includes a first lock portion provided in the outer case 1, a second lock portion provided in the inner case 2, and a closing lock urging element. The position or the state of the second lock portion can be changed between a lock position at which the second lock portion engages with the first lock portion and a lock release position at which the engagement is released. The closing lock urging element urges the second lock portion toward the lock position. In addition, the operation end portion 3 can change the position or the state of the second lock portion to the lock release position, against the urging force of the closing lock urging element. It should be noted that the operation end portion 3 can operate so as to release not only the closing lock portion but also the lock body 8 described later.

The first guide member 4 includes a slide guide portion 15 having a rail shape, and a rack portion 16 disposed below the slide guide portion 15. The first guide member 4 is integrated with the inner face of the outer case 1. It should be noted that the shape of the slide guide portion 15 is not limited to the rail shape and may be simply a long hole shape or the like, for example.

The second guide member 5 includes: a pinion portion 17 meshed with the rack portion 16; and a guide shaft 18 disposed coaxially with the pinion portion 17, protruding in the axial direction of the pinion portion 17, and slidably engaging with the slide guide portion 15. The positions of the pinion portion 17 and the guide shaft 18 are changed in a synchronized manner. The second guide member 5 is axially supported in a front end and lower end portion of the inner case 2. The first guide member 4 and the second guide member 5 are interposed between the outer case 1 and the inner case 2. Thus, the inner case 2 is guided along the slide guide portion 15 and the rack portion 16, whereby the position of the inner case 2 is changed relative to the outer case 1.

The link member 50 includes a link base 51, and a first link shaft 52 and a second link shaft 53 which are fixed to the link base 51. The first link shaft 52 is axially supported by the outer case 1 and the second link shaft 53 is axially supported by the inner case 2. More specifically, the first link shaft 52 is axially supported by the outer case 1, above the inner case 2 and in a rear end portion (in the vicinity of the entry hole 11) of the outer case 1. The second link shaft 53 is axially supported by the inner case 2, in a rear end and lower end portion of the inner case 2. The link member 50 swings about the first link shaft 52 relative to the outer case 1. In addition, the inner case 2 swings about the second link shaft 53 relative to the link member 50. Thus, the inner case 2 biaxially swings relative to the outer case 1 about the first link shaft 52 and the second link shaft 53.

The open/close guide portion 7 has a long groove shape extending in the up-down direction, and is provided on a side face of the outer case 1. Specifically, a guide plate 19 having a plate shape is mounted on the side face of the outer case 1, and the open/close guide portion 7 is formed in the guide plate 19. The lower end of the open/close guide portion 7 is referred to as a first guide end 20 and the upper end of the open/close guide portion 7 is referred to as a second guide end 21.

The open/close urging element 6 is composed of a gas spring. The open/close urging element 6 in the glove box of Embodiment 1 expands to release urging force and compresses to accumulate urging force. One end portion in the expanding/compressing direction (longitudinal direction) of the open/close urging element 6 is a slide end portion 23, and the other end portion of the open/close urging element 6 is a pivot end portion 24. The slide end portion 23 has a substantially pin shape, and slidably engages with the open/close guide portion 7 described above. Specifically, the slide end portion 23 is slidable along the longitudinal direction of the open/close guide portion 7. Thus, between the opposed ends of the open/close guide portion 7, that is, between the first guide end 20 and the second guide end 21, a region in which the slide end portion 23 can slide, i.e., a slide region, is formed. The pivot end portion 24 is pivotally supported by a pivot seat 25 provided on the front end and lower end side of the inner case 2.

It is sufficient that the open/close urging element 6 can expand/compress and can accumulate and release urging force, and may not have a damper function as in a gas spring. For example, a coil spring or the like may be used as the open/close urging element 6. In Embodiment 1, a gas spring having an urging function and a damper function is used as the open/close urging element 6. However, for example, an urging element (coil spring or the like) having only an urging function and a damper element (oil damper or the like) having only a damper function may be combined together to be used as the open/close urging element 6. In this case, the urging element and the damper element may be integrated with each other, or may not be integrated with each other.

The lock body 8 has a tapered face 26, and an interference portion 28 having a flat face 27 which is substantially on the back side to the tapered face 26. The lock body 8 has a substantially columnar shape as a whole. The lock body 8 is held by the side face of the outer case 1 with the tapered face 26 facing upward, and is slidable relative to the outer case 1. The lock body 8 is disposed to the front side of the open/close guide portion 7, with the sliding direction (the longitudinal direction in Embodiment 1) of the lock body 8 set along a direction that crosses the longitudinal direction of the open/close guide portion 7 (a direction orthogonal to the longitudinal direction of the open/close guide portion 7 in Embodiment 1). More specifically, the lock body 8 has the interference portion 28 facing the rear side.

The lock body 8 is slidable between the lock position shown in FIG. 1 and a withdrawal position shown in FIG. 2. More specifically, at the lock position, at least the interference portion 28 of the lock body 8 protrudes in the slide region formed between the lower end (the first guide end 20) and the upper end (the second guide end 21) of the open/close guide portion 7. That is, at the lock position shown in FIG. 1, the lock body 8 protrudes in the slide region for the slide end portion 23. At this time, there is a gap 29 (referred to as lock region 29) in which the slide end portion 23 can be disposed, between the interference portion 28 and the first guide end 20. Further, at this time, there is also a gap 30 between the interference portion 28 and the second guide end 21. The lock region 29 is much shorter than the gap 30. At the release position, the entirety of the lock body 8 withdraws to the front side relative to the open/close guide portion 7. That is, the interference portion 28 withdraws to the outside of the slide region, does not interfere with the slide end portion 23, and allows the slide end portion 23 to slide.

As described later, during closing operation of the inner case 2, the lock body 8 is disposed at the lock position, and the slide end portion 23 of the open/close urging element 6 is locked in the lock region 29.

When the slide end portion 23 is locked in the lock region 29, the open/close urging element 6 expands or compresses in accordance with the distance between the pivot end portion 24 and the slide end portion 23. Since the pivot end portion 24 is pivotally supported by the inner case 2 and the slide end portion 23 is locked in the lock region 29, the distance between the pivot end portion 24 and the slide end portion 23 is closely related to the position of the inner case 2.

The lock body 8 is fixed to a lock plate 31 having a substantially plate shape. The lock plate 31 is mounted to the side face of the outer case 1 so as to be substantially parallel to the side face of the outer case 1. The lock plate 31 is slidable relative to the outer case 1.

The lock urging element 9 is composed of a coil spring and is mounted to the lock plate 31 and the outer case 1. The lock urging element 9 urges the lock plate 31 toward the rear side, thereby urging the lock body 8 toward the lock position. That is, the interference portion 28 of the lock body 8 is urged by the lock urging element 9 toward the inside of the open/close guide portion 7. The lock body 8 and the lock urging element 9 are collectively referred to as an urge lock portion.

One end (take-up end portion 32) of the constant force spring 10 (so-called conston spring) is fixed to a rear end portion of the outer case 1, and the other end (pull-out end portion 33) is mounted to a front side portion of the inner case 2. When the position of the inner case 2 is changed from the open position to the closed position, the distance between the pull-out end portion 33 and the take-up end portion 32 becomes long. When the position of the inner case 2 is changed from the closed position to the open position, the distance between the pull-out end portion 33 and the take-up end portion 32 becomes short. Accordingly, when the position of the inner case 2 is changed from the open position to the closed position, the constant force spring 10 is developed (in other words, expands) to accumulate urging force. Then, when the position of the inner case 2 is changed from the closed position to the open position, the constant force spring 10 is taken up (in other words, compresses) to release urging force. That is, the constant force spring 10 urges the inner case 2 from the closed position to the open position. It should be noted that the urging force of the constant force spring 10 is smaller than the urging force of the open/close urging element 6.

As shown in FIG. 1, when the inner case 2 is disposed at the closed position, the constant force spring 10 urges the inner case 2 in the opening direction. At this time, since the open/close urging element 6 has not fully expanded, the open/close urging element 6 urges the inner case 2 in the closing direction. Since the urging force of the open/close urging element 6 is greater than the urging force of the constant force spring 10, the inner case 2 is urged toward the closed position against the urging force of the constant force spring 10 at this time. The inner case 2 is further locked at the closed position by the closing lock element. It should be noted that the glove box of Embodiment 1 includes the closing lock element but the closing lock element is not indispensable in the glove box of the present invention.

Opening/closing operation of the inner case in the glove box of Embodiment 1 will be described below.

During opening operation, the position of the inner case 2 is changed from the closed position shown in FIG. 1 to the open position shown in FIG. 4. At this time, the guide shaft 18 slides while rotating in the slide guide portion 15 from the front side toward the rear side. In Embodiment 1, the slide guide portion 15 linearly extends in the front-rear direction. Thus, the slide mechanism composed of the slide guide portion 15 and the guide shaft 18 linearly guides the inner case 2 in the front-rear direction. It is sufficient that the slide guide portion 15 can guide the inner case 2 in the front-rear direction as a whole, and may be inclined. This inclination angle is preferably small. Specifically, the inclination angle is preferably within ±30° relative to the front-rear direction (the horizontal direction).

Since the guide shaft 18 is axially supported in a front end and lower end portion of the inner case 2, at least the front end and lower end portion of the inner case 2 slides in the front-rear direction almost in a parallel movement during opening/closing operation. In Embodiment 1, the guide shaft 18 is axially supported by the inner case 2, but for example, in such a case where the pinion portion 17 is not provided, the guide shaft 18 may be fixed to the inner case 2 or may be directly formed in the inner case 2.

On the other hand, the link member 50 has two shafts (the first link shaft 52, the second link shaft 53). In addition, the inner case 2 is axially supported by the outer case 1 via the link member 50. Accordingly, the inner case 2 biaxially swings relative to the outer case 1. Since the inner case 2 biaxially swings by means of the link member 50 (that is, the link mechanism) having the first link shaft 52 and the second link shaft 53, the inner case 2 can take various positions relative to the outer case. Thus, the glove box of Embodiment 1 can linearly guide the inner case 2 toward the rear side by means of the slide mechanism described above, and can cause the inner case 2 to swing by means of the link mechanism. Moreover, the second link shaft 53 of the link member 50 is pivotally supported in a rear portion of the inner case 2. Thus, the link mechanism can cause the inner case 2 to swing and can guide the rear portion of the inner case 2 downward. Accordingly, during the opening operation, the entirety of the inner case 2 moves rearward, and at least the rear portion of the inner case 2 swings downward. Therefore, the inner case 2 operates to open substantially obliquely downward. Accordingly, change in the center of gravity in the up-down direction of the inner case 2 is small. Thus, the inner case 2 operates to open under a comparatively small force. It should be noted that during closing operation, the inner case 2 operates in a direction reverse to the direction during the opening operation. That is, the entirety of the inner case 2 moves forward by means of the slide mechanism, and at least the rear portion of the inner case 2 swings upward by means of the link mechanism. Accordingly, also in this case, a large change in the center of gravity in the up-down direction of the inner case 2 can be suppressed, and the inner case 2 operates to close under a comparatively small force.

In the glove box of Embodiment 1, the supporting point (the guide shaft 18) in the slide mechanism and the supporting points (the first link shaft 52 and the second link shaft 53) in the link mechanism are distanced from each other in the front, rear, and up directions of the inner case 2. Specifically, the position in the front-rear direction of the guide shaft 18 relative to the inner case 2 is provided further to the front side relative to a front-side ¼ position of the inner case 2. Then, the position in the front-rear direction of the second link shaft 53 is provided to the rear side relative to a front-side ⅓ position of the inner case 2. With respect to the glove box of the present invention, it is considered that, when the distance between the second link shaft 53 and the guide shaft 18 is sufficiently large, the center of gravity of the inner case 2 can be disposed between the second link shaft 53 and the guide shaft 18, and thus, the inner case 2 operates to open/close in a stable manner. That is, when taking into consideration the operational stability of the inner case 2, it is preferable that the distance between the second link shaft 53 and the guide shaft 18 is large. In the glove box of Embodiment 1, the second link shaft 53 and the guide shaft 18 are greatly distanced from each other in the front-rear direction (that is, the guided direction of the inner case 2 by the slide mechanism described above). Accordingly, the inner case 2 slides and swings in a stable manner, and the force required in opening/closing the inner case 2 is reduced. For reference, preferably, the distance between the second link shaft 53 and the guide shaft 18 in the front-rear direction is not less than ½ of the entire length of the inner case 2 in the front-rear direction.

In Embodiment 1, the guide shaft 18 is provided in the front and lower portion of the inner case 2. However, it is sufficient that the position of the guide portion 18 is in a front portion of the inner case, and is not limited thereto. For example, the guide portion 18 may be provided in a front and upper portion of the inner case. In this case, it is sufficient that the slide guide portion 15 is provided at a position corresponding to the position of the guide portion 18.

Operation of an open/close driving mechanism in the glove box of Embodiment 1 will be described below.

(Opening Operation)

As shown in FIG. 1, at the closed position, the slide end portion 23 of the open/close urging element 6 is locked in the lock region 29 by the urge lock portion. At this time, the slide end portion 23 abuts against the flat face 27 of the lock body 8. The flat face 27 is orthogonal to the sliding direction of the slide end portion 23. Thus, even if the slide end portion 23 presses the flat face 27, the lock body 8 does not slide and locks the slide end portion 23 in the lock region 29.

When the operation end portion 3 is pressed in this state, the closing lock element is released and the position of the inner case 2 becomes changeable. Also at this time, as shown in FIG. 2, the lock body 8 of the urge lock portion is pressed to the front side (the leading side in the vehicle's traveling direction) against the urging force of the lock urging element 9. Accordingly, at this time, the lock between the interference portion 28 of the lock body 8 and the slide end portion 23 is released, and the slide end portion 23 becomes slidable in the open/close guide portion 7 from the first guide end 20 side toward the second guide end 21 side.

As described above, the inner case 2 is urged toward the open position by the constant force spring 10. Thus, as described above, when the lock by the urge lock portion and the closing lock element is released, the position of the inner case 2 is changed toward the open position. At this time, urging force is slightly accumulated in the open/close urging element 6. However, since the slide end portion 23 can slide in the open/close guide portion 7 at this time, the urging force of the open/close urging element 6 does not act on the inner case 2. That is, at this time, the open/close urging element 6 slightly expands while causing the slide end portion 23 to slide from the first guide end 20 side toward the second guide end 21 side of the open/close guide portion 7. Further in other words, since the slide end portion 23 is slidable in the open/close guide portion 7 at this time, the urging force of the open/close urging element 6 is released, and does not act on the inner case 2.

As shown in FIG. 2 to FIG. 3, during opening operation of the inner case 2, until the inner case 2 reaches a position between the closed position and the open position (that is, the half-open position), the slide end portion 23 slides in the open/close guide portion 7 from the first guide end 20 side toward the second guide end 21 side. Accordingly, the urging force of the open/close urging element 6 does not act on the inner case 2 and the compression force associated with the movement of the inner case 2 does not act on the open/close urging element 6. That is, at this time, the open/close urging element 6 and the inner case 2 are physically connected to each other, but are blocked from each other in terms of urging force, and the urging force is not accumulated in the open/close urging element 6.

Associated with the change in the position of the inner case 2 from the closed position shown in FIG. 1 toward the half-open position shown in FIG. 3, the distance between the open/close guide portion 7 and the pivot end portion 24 (more specifically, the distance between the lock region 29 and the pivot end portion 24) becomes gradually small. Then, at the half-open position shown in FIG. 3 and FIG. 5, the distance therebetween becomes smallest.

On the other hand, associated with the change in the position of the inner case 2 from the half-open position shown in FIG. 3 toward the open position shown in FIG. 4, the distance between the open/close guide portion 7 and the pivot end portion 24 becomes gradually large. Accordingly, when the position of the inner case 2 is changed from the half-open position toward the open position, force in the expanding direction acts on the open/close urging element 6. The open/close guide portion 7 extends in the up-down direction, and at the half-open position, the pivot end portion 24 is located further to the lower side of the open/close guide portion 7. Accordingly, when the position of the inner case 2 is changed from the half-open position to the open position, the open/close urging element 6 is pulled toward the lower side, and the slide end portion 23 slides in the open/close guide portion 7 toward the lower side. The upper face of the interference portion 28 of the lock body 8 is formed as the tapered face 26, and thus, at this time, the slide end portion 23 presses the tapered face 26 from the upper side toward the lower side. The tapered face 26 is an inclined surface that is not orthogonal to the sliding direction of the lock body 8. Thus, when the slide end portion 23 presses the tapered face 26, force toward the sliding direction acts on the lock body 8. This force is greater than the urging force of the lock urging element 9, and thus, the lock body 8 slides to the withdrawal position. Accordingly, at this time, the slide end portion 23 slides in the open/close guide portion 7 against the lock body 8, to be disposed on the lower side of the lock body 8, that is, to be disposed in the lock region 29. When the slide end portion 23 is disposed to the lower side relative to the lock body 8, the slide end portion 23 no longer presses the lock body 8, and thus, the lock body 8 moves to the lock position again under the urging force of the lock urging element 9. Then, the slide end portion 23 abuts against the flat face 27 of the interference portion 28, to be locked in the lock region 29.

It should be noted that until the inner case 2 reaches the open position from the half-open position, the length in the expanding/compressing direction of the open/close urging element 6 hardly changes. That is, in Embodiment 1, until the inner case 2 reaches the open position from the closed position, the urging force by the open/close urging element 6 does not act on the inner case 2. The inner case 2 is urged from the closed position toward the open position under the urging force of the constant force spring 10.

Further, as described above, until the inner case 2 reaches the open position from the closed position, the length in the expanding/compressing direction of the open/close urging element 6 hardly changes. Accordingly, also at the open position, slight urging force is still accumulated in the open/close urging element 6. Thus, the open/close urging element 6 urges the inner case 2 toward the open position, and the inner case 2 is locked at the open position under this urging force. The inner case 2 is locked at the open position also under the urging force of the constant force spring 10.

(Closing Operation)

As described above, at the half-open position shown in FIG. 3 and FIG. 5, the distance between the lock region 29 and the pivot end portion 24 becomes smallest. Then, as shown in FIG. 5, the distance between the slide end portion 23 and the pivot end portion 24 at the half-open position during closing operation takes the smallest value that the distance between the slide end portion 23 and the pivot end portion 24 in the glove box of Embodiment 1 can take. Thus, during the closing operation, until the inner case 2 reaches the half-open position from the open position, urging force is accumulated in the open/close urging element 6, and until the inner case 2 reaches the closed position from the half-open position, the urging force accumulated in the open/close urging element 6 is released. At the half-open position, urging force has been accumulated in the open/close urging element 6. However, the releasing direction (that is, the up-down direction) of the urging force of the open/close urging element 6 and the open/close direction (the front-rear direction) of the inner case 2 are orthogonal to each other. Thus, at the half-open position, the open/close urging element 6 is in a state as if being locked, and does not release the urging force.

More specifically, when the position of the inner case 2 is changed from the open position to the half-open position, the distance between the lock region 29 and the pivot end portion 24 becomes gradually short, and force in the compressing direction acts on the open/close urging element 6. Thus, at this time, the slide end portion 23 of the open/close urging element 6 is to slide in the open/close guide portion 7 from a lower position upward, but locked by the urge lock portion, and cannot slide upward. Accordingly, at this time, the open/close urging element 6 is compressed, and urging force is accumulated in the open/close urging element 6.

At this time, the constant force spring 10 is taken up to accumulate urging force. Thus, from the open position to the half-open position, the passenger needs to drive the inner case 2 manually. However, at this time, the inner case 2 has been pulled out from the entry hole 11 and is located near the passenger. Thus, at this time, the passenger can drive the inner case 2 to be closed without feeling stressed. Further, since the open/close urging element 6 in Embodiment 1 is composed of a gas spring and also has a function of a damper, the open/close urging element 6 gently operates. Thus, the passenger does not feel stressed very much in driving the inner case 2 to be closed from the open position to the half-open position, and in addition, the inner case 2 gently operates, whereby the passenger senses luxurious feel of the glove box.

Then, from the half-open position to the closed position, the inner case 2 is urged by the open/close urging element 6. That is, at this time, the inner case 2 is driven to be closed, and closes automatically. Since the inner case 2 is gently pulled in toward the closed position by the open/close urging element 6 composed of a gas spring, luxurious feel is provided to the glove box.

According to the glove box of Embodiment 1, since a part of the closing operation is performed by use of the urging force of the open/close urging element 6, compared with a case of manually driving the glove box to be opened/closed, stress on the passenger is reduced. In addition, during the opening operation, the open/close urging element 6 does not compress. Thus, even if the constant force spring 10 is not provided, the operation load for the inner case 2 during the opening operation is small.

Further, since the gas spring also having a damper function is used as the open/close urging element 6, the inner case 2 gently operates and luxurious feel can be provided to the glove box. It should be noted that, in Embodiment 1, the open/close urging element 6 which has both the urging function and the damper function is used, but an elastic body (for example, merely a coil spring, or the like) not having a damper function may be used as the open/close urging element 6. Further, an elastic body not having a damper function and a damper having a known structure may be used in combination. In this case, it is sufficient that the combination of the elastic body and the damper is considered as the open/close urging element 6.

In Embodiment 1, the first guide member 4 and the second guide member 5 (more specifically, the slide mechanism composed of the slide guide portion 15 and the guide shaft 18) linearly guide the sliding direction of the inner case 2. However, the guided direction of the inner case 2 by the slide mechanism is not limited thereto. That is, it is sufficient that the guided direction of the inner case 2 by the slide mechanism is a direction that allows the inner case 2 to be pulled out from the entry hole 11 of the outer case 1 to the outside. For example, the inner case 2 may rotate while sliding by being guided by the slide mechanism. In this case, the slide mechanism guides the sliding direction of the inner case 2 in a curved manner.

In Embodiment 1, the opening operation of the inner case 2 is urged by the constant force spring 10. However, the opening operation may be performed by the user manually without the constant force spring 10 provided. Alternatively, with the open/close guide portion 7 inclined from the leading and up direction toward the rear and down direction in the vehicle's traveling direction, the inner case 2 may be configured to operate to open under the weight of the inner case 2 itself. In any case, from the open position to the half-open position, the open/close urging element 6 does not compress, and the load form the compression force of the open/close urging element 6 does not act on the inner case 2 during opening operation. Accordingly the inner case 2 can be pulled out with a comparatively small force.

Embodiment 2

Figure 7:
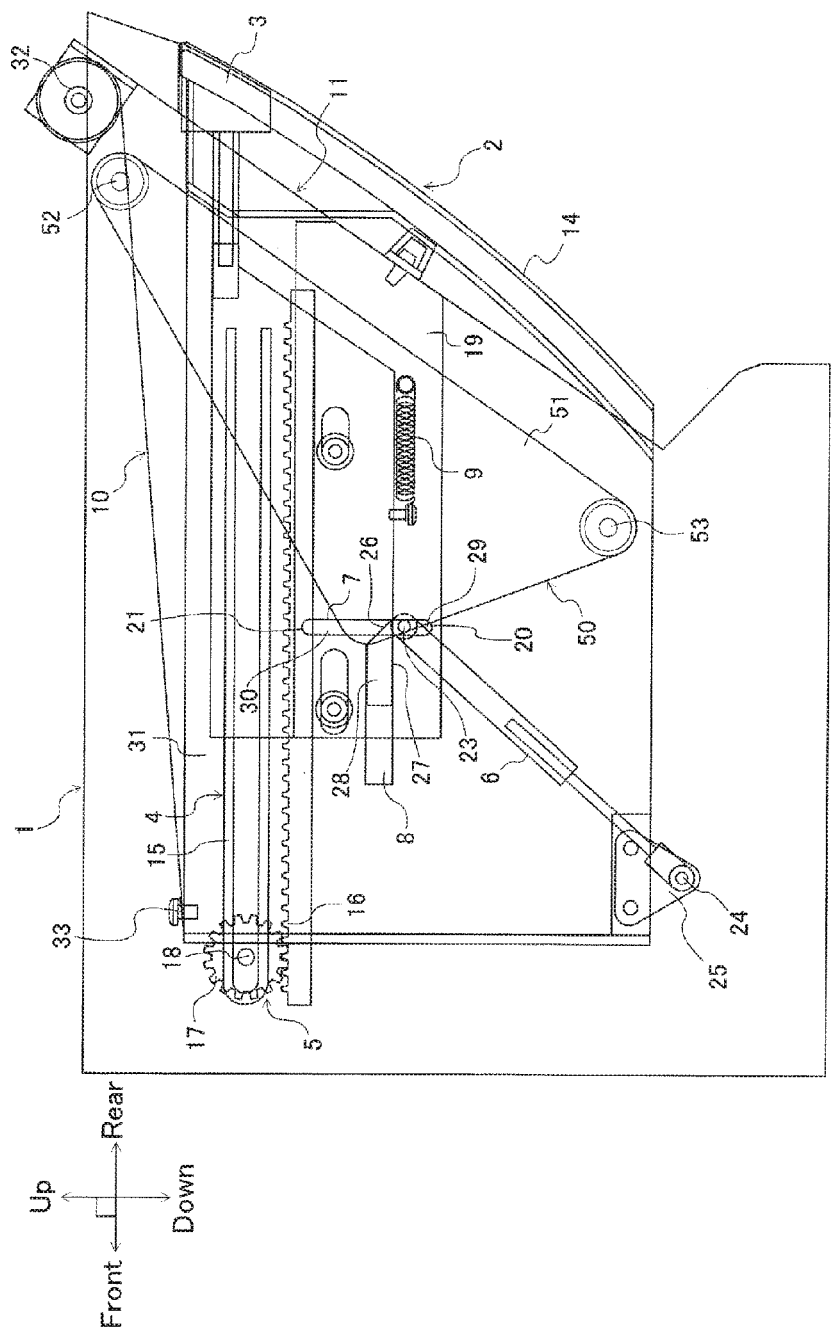
FIG. 7 is an explanatory drawing schematically showing the glove box of Embodiment 2 with the inner case at the closed position.
Figure 8:
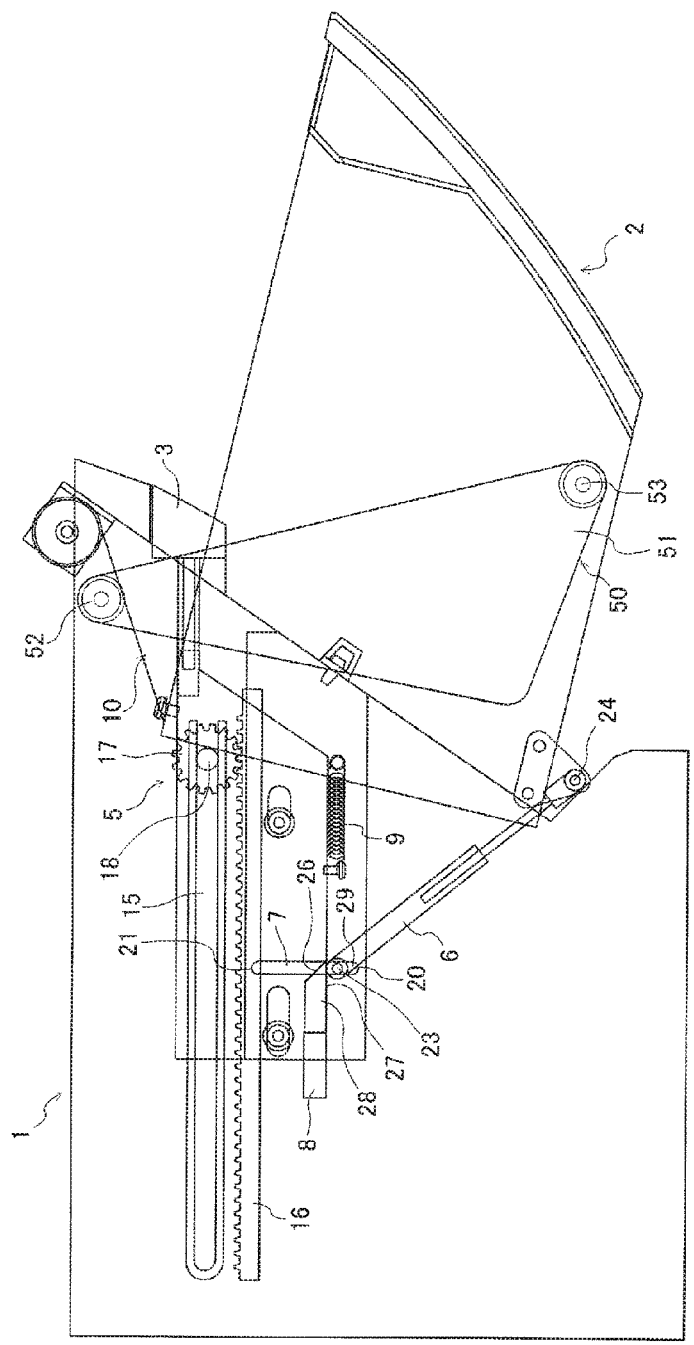
FIG. 8 is an explanatory drawing schematically showing the glove box of Embodiment 2 with the inner case at the open position.

FIG. 7 and FIG. 8 each show an explanatory drawing schematically showing the glove box of Embodiment 2. Specifically, FIG. 7 shows the glove box with the inner case at the closed position, and FIG. 8 shows the glove box with the inner case at the open position. Hereinafter, in Embodiment 2, "up", "down", "front", and "rear" respectively refer to "up", "down", "front", and "rear" shown in FIG. 7.

The glove box of Embodiment 2 is substantially the same as the glove box of Embodiment 1 except the positions of the first guide member 4 and the second guide member 5. The first guide member 4 includes the slide guide portion 15, and the rack portion 16 disposed below the slide guide portion 15. The shapes of the slide guide portion 15 and the rack portion 16 are substantially the same as the shapes of the slide guide portion 15 and the rack portion 16 in the glove box of Embodiment 1. The first guide member 4 is integrated with the inner face of the outer case 1 in an upper portion of the outer case 1.

The second guide member 5 includes the pinion portion 17 and the guide shaft 18. The shapes of the pinion portion 17 and the guide shaft 18 are substantially the same as the shapes of the pinion portion 17 and the guide shaft 18 in the glove box of Embodiment 1. The pinion portion 17 and the guide shaft 18 are axially supported by the inner case 2 in a front end and upper portion of the inner case 2.

Similarly to the glove box of Embodiment 1, the position of the glove box of Embodiment 2 can be changed between the closed position shown in FIG. 7 and the open position shown in FIG. 8. In the glove box of Embodiment 2, during opening operation, the position of the inner case 2 is changed from the closed position shown in FIG. 7 to the open position shown in FIG. 8. Similarly to the slide guide portion 15 in the glove box of Embodiment 1, the slide guide portion 15 in the glove box of Embodiment 2 linearly extends in the front-rear direction. Thus, also in the glove box of Embodiment 2, the slide mechanism composed of the slide guide portion 15 and the guide shaft 18 linearly guides the inner case 2 in the front-rear direction. Since the guide shaft 18 in the glove box of Embodiment 2 is axially supported in a front end and upper end portion of the inner case 2, at least the front end and upper end portion of the inner case 2 slides in the front-rear direction almost in a parallel movement during opening/closing operation. Similarly to the link member 50 in the glove box of Embodiment 1, the link member 50 has two shafts (that is, the first link shaft 52, the second link shaft 53), and the second link shaft 53 of these is pivotally supported in a rear portion of the inner case 2. Thus, similarly to the glove box of Embodiment 1, in the glove box of Embodiment 2, the inner case 2 operates to open substantially obliquely downward during opening operation. Accordingly, change in the center of gravity in the up-down direction of the inner case 2 is small, as in Embodiment 1. In other words, similarly to Embodiment 1, the inner case 2 in the glove box of Embodiment 2 operates to open under a comparatively small force. Also during closing operation, the inner case 2 operates to close under a comparatively small force.

Embodiment 3

Figure 9:
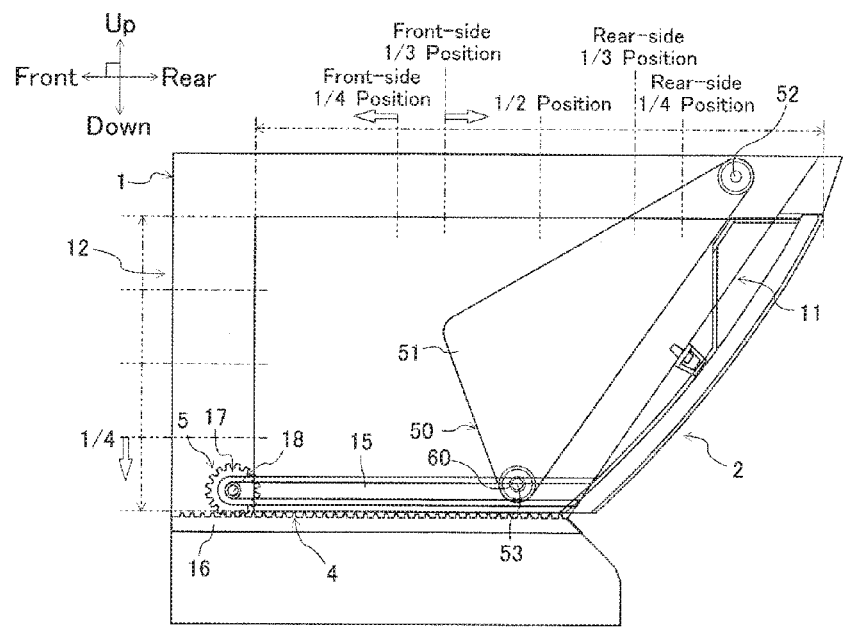
FIG. 9 is an explanatory drawing schematically showing the glove box of Embodiment 3 with the inner case at the closed position.
Figure 10:
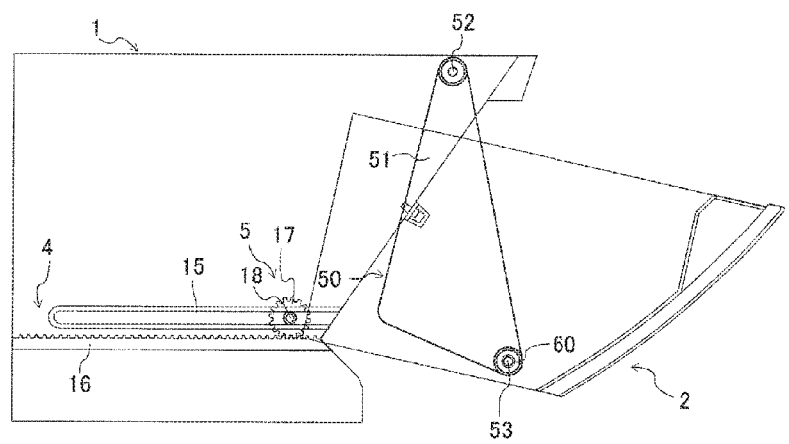
FIG. 10 is an explanatory drawing schematically showing the glove box of Embodiment 3 with the inner case at the open position.
Figure 11:
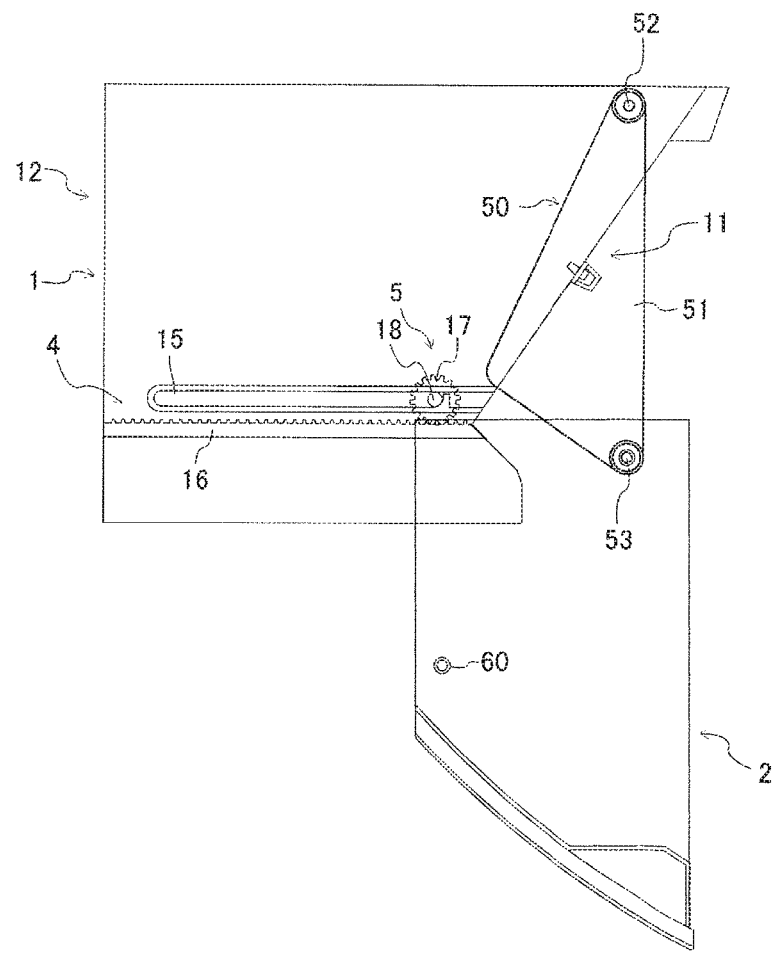
FIG. 11 is an explanatory drawing schematically showing the glove box of Embodiment 3 with the inner case rotated at the open position.

FIG. 9 to FIG. 11 each show an explanatory drawing schematically showing the glove box of Embodiment 3. Specifically, FIG. 9 shows the glove box with the inner case at the closed position. FIG. 10 shows the glove box with the inner case at the open position. FIG. 11 shows the glove box with the inner case rotated. Hereinafter, in the embodiment, "up", "down", "front", and "rear" respectively refer to "up", "down", "front", and "rear" shown in FIG. 9. It should be noted that "front" corresponds to the leading side of the vehicle's traveling direction. "Rear" corresponds to the rear side of the vehicle's traveling direction, that is, the inward side of the vehicle's cabin.

As shown in FIG. 9, the glove box of Embodiment 3 includes the outer case 1, the inner case 2, the closing lock element (not shown), the first guide member 4, the second guide member 5, and the link member 50.

The outer case 1 is assembled in the instrument panel (not shown) of the automobile. Specifically, the outer case 1 has a box shape having the entry hole 11 and a communication hole 12. In the outer case 1, the entry hole 11 faces the design face (that is, the rear face, the face exposed in the vehicle's cabin) of the instrument panel, and the communication hole 12 faces the farther side (that is, the front side of the vehicle's traveling direction) of the instrument panel. In Embodiment 3, the outer case 1 is a separate body from the instrument panel, and is assembled in the instrument panel. However, it is sufficient that the outer case 1 can accommodate the inner case 2 therein, and is not limited to this shape. For example, at least a part of the outer case 1 may be formed with a vehicle component member such as the instrument panel or the like. Further, the outer case 1 may include an opening other than the entry hole 11 and the communication hole 12. Further to the front side to the communication hole 12, an air conditioner not shown is provided.

The inner case 2 has a box shape capable of being accommodated inside the outer case 1. The position of the inner case 2 can be changed between the closed position shown in FIG. 9 and the open position shown in FIG. 12, by being guided by the first guide member 4 and the second guide member 5 described later. Specifically, the first guide member 4 and the second guide member 5 guide the sliding direction of the inner case 2. The front wall 14 of the inner case 2 is flush with the instrument panel at the closed position.

The closing lock element has a known lock structure, and can be driven by an operation end portion not shown. More specifically, the closing lock element (not shown) in Embodiment 3 includes a first lock portion provided in the outer case 1, a second lock portion provided in the inner case 2, a closing lock urging element, and the operation end portion. The position or the state of the second lock portion can be changed between a lock position at which the second lock portion engages with the first lock portion and a lock release position at which the engagement is released. The closing lock urging element urges the second lock portion toward the lock position. In addition, the operation end portion is exposed in the vehicle's cabin, and can change the position or the state of the second lock portion to the lock release position, against the urging force of the closing lock urging element.

The first guide member 4 includes the slide guide portion 15 having a rail shape, and the rack portion 16 disposed below the slide guide portion 15. The first guide member 4 is integrated with the inner face of the outer case 1. It should be noted that the shape of the slide guide portion 15 is not limited to the rail shape and may be simply a long hole shape, for example.

The second guide member 5 includes: the pinion portion 17 meshed with the rack portion 16; and the guide shaft 18 disposed coaxially with the pinion portion 17, protruding in the axial direction of the pinion portion 17, and slidably engaging with the slide guide portion 15. The positions of the pinion portion 17 and the guide shaft 18 are changed in a synchronized manner. The second guide member 5 is axially supported in a front end and lower end portion of the inner case 2. The first guide member 4 and the second guide member 5 are interposed between the outer case 1 and the inner case 2. Thus, the inner case 2 is guided along the slide guide portion 15 and the rack portion 16, whereby the position of the inner case 2 is changed relative to the outer case 1. It should be noted that the opening rotation shaft in the glove box of Embodiment 3 is the guide shaft 18.

The position in the front-rear direction of the guide shaft 18 relative to the inner case 2 is further to the front side relative to a front-side ¼ position of the inner case 2 as shown in FIG. 9. In other words, the guide shaft 18 is disposed, relative to the inner case 2, further to the front side relative to the front-side ¼ position of the entire length of the inner case 2 in the front-rear direction.

Moreover, as shown in FIG. 9, the position in the up-down direction of the guide shaft 18 relative to the inner case 2 is further to the lower side relative to a lower-side ¼ position of the inner case 2. In other words, the guide shaft 18 is disposed, relative to the inner case 2, further to the lower side relative to the lower-side ¼ position of the entire length of the inner case 2 in the up-down direction.

The link member 50 includes the link base 51, and the first link shaft 52 and the second link shaft 53 which are fixed to the link base 51. The first link shaft 52 is axially supported by the outer case 1, and the second link shaft 53 is axially supported by the inner case 2. More specifically, the first link shaft 52 is axially supported by the outer case 1 above the inner case 2 and in a rear end portion (that is, in the vicinity of the entry hole 11) of the outer case 1. The second link shaft 53 is axially supported by the inner case 2, in a rear end and lower end portion of the inner case 2. More specifically, the second link shaft 53 detachably engages with a link engagement portion 60 provided on a side face of the inner case 2. The link member 50 swings about the first link shaft 52 relative to the outer case 1. In addition, the inner case 2 swings about the second link shaft 53 relative to the link member 50. Thus, the inner case 2 biaxially swings relative to the outer case 1 about the first link shaft 52 and the second link shaft 53.

Opening/closing operation of the inner case 2 in the glove box of Embodiment 3 will be described below.

Figure 12:
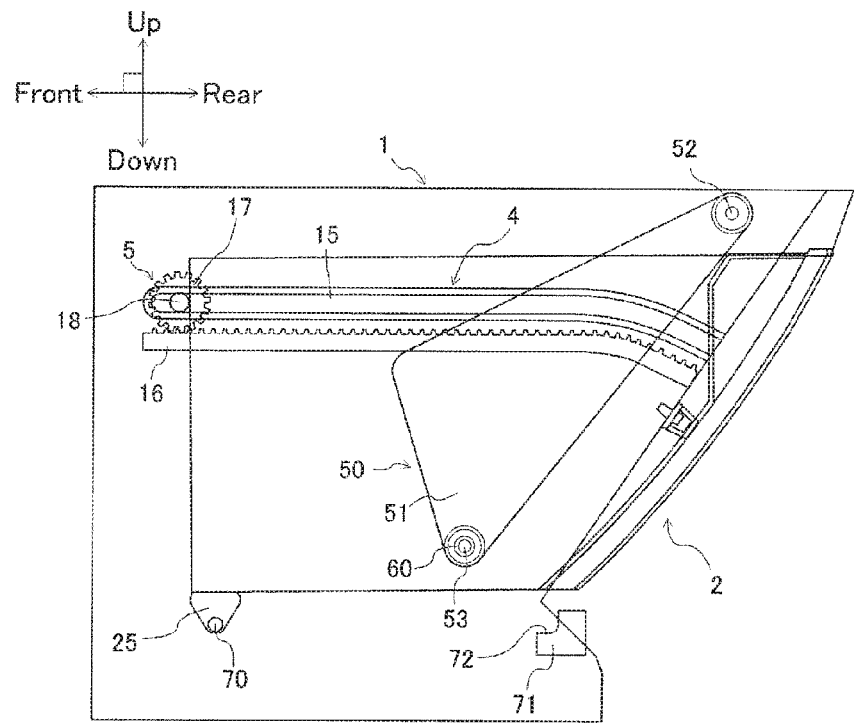
FIG. 12 is an explanatory drawing schematically showing the glove box of Embodiment 4 with the inner case at the closed position.

During opening operation, the position of the inner case 2 is changed from the closed position shown in FIG. 9 to the open position shown in FIG. 12. At this time, the guide shaft 18 slides while rotating in the slide guide portion 15 from the front side toward the rear side. In Embodiment 3, the slide guide portion 15 linearly extends in the front-rear direction. Thus, the slide mechanism composed of the slide guide portion 15 and the guide shaft 18 linearly guides the inner case 2 in the front-rear direction. It is sufficient that the slide guide portion 15 can guide the inner case 2 in the front-rear direction as a whole, and may be inclined. This inclination angle is preferably small. Specifically, the inclination angle is preferably within ±30° relative to the front-rear direction (that is, the horizontal direction).

Since the guide shaft 18 is axially supported in a front end and upper end portion of the inner case 2, at least the front end and upper end portion of the inner case 2 slides in the front-rear direction almost in a parallel movement during opening/closing operation. In Embodiment 3, the guide shaft 18 is axially supported by the inner case 2, but for example, in such a case where the pinion portion 17 is not provided, the guide shaft 18 may be fixed to the inner case 2 or may be directly formed in the inner case 2.

On the other hand, the link member 50 has two shafts (that is, the first link shaft 52, the second link shaft 53). In addition, the inner case 2 is axially supported by the outer case 1 via the link member 50. Accordingly, the inner case 2 biaxially swings relative to the outer case 1. Since the inner case 2 biaxially swings by means of the link member 50 (that is, the link mechanism) having the first link shaft 52 and the second link shaft 53, the inner case 2 can take various positions relative to the outer case 1. Thus, the inner case 2 can be linearly guided toward the rear side by means of the slide mechanism described above, and the inner case 2 can be caused to swing by means of the link mechanism. Moreover, the second link shaft 53 of the link member 50 is pivotally supported in a rear portion of the inner case 2. Thus, the link mechanism can cause the inner case 2 to swing and can guide the rear portion of the inner case 2 downward. That is, during the opening operation, the entirety of the inner case 2 moves rearward, and at least the rear portion of the inner case 2 swings downward. Therefore, the inner case 2 operates to open substantially obliquely downward (FIG. 10).

When the inner case 2 operates to open obliquely downward to be disposed at the open position as described above, the second link shaft 53 is disposed to the front side of the outer case 1. Since the second link shaft 53 and the link engagement portion 60 of the inner case 2 are detachable from each other, the inner case 2 can be dismounted from the second link shaft 53 at this time. Specifically, in Embodiment 3, the link engagement portion 60 is provided to a side face of the inner case 2. The link engagement portion 60 has a substantially tubular shape and retractably protrudes from the side face of the inner case 2 toward the outer case 1 side (that is, the second link shaft 53 side). The link engagement portion 60 is urged toward the outer case 1 side by an engagement urging element not shown, to engage with the second link shaft 53. In other words, the second link shaft 53 is pivotally supported by the link engagement portion 60. When the link engagement portion 60 is pressed against the urging force of the engagement urging element, the engagement between the second link shaft 53 and the link engagement portion 60 is released. Accordingly, the inner case 2 can be dismounted from the second link shaft 53.

At this time, the guide shaft 18 is still supported by the slide guide portion 15. Thus, the inner case 2 rotates clockwise about the opening rotation shaft (that is, the guide shaft 18). The slide guide portion 18 is located in a front and lower portion of the inner case 2. Thus, the inner case 2 having rotated is disposed to the lower side relative to the entry hole 11 as shown in FIG. 11. Accordingly, the inside of the outer case 1 is exposed through the entry hole 11. Moreover, the front side of the outer case 1 is open to form the communication hole 12. Thus, the air conditioner not shown provided further forward of the outer case 1 is exposed through the communication hole 12 and the entry hole 11. Accordingly, at this time, replacement of a filter of the air conditioner or the like is enabled. That is, according to the glove box of Embodiment 3, by further rotating the inner case 2 disposed at the open position, a vehicle component provided forward of the outer case 1 can be easily accessed.

When taking into consideration that the inner case 2 is rotated at the open position to expose the inside of the outer case 1, the opening rotation shaft (the guide shaft 18 in Embodiment 3) needs to be provided in a front and lower portion of the inner case 2. For example, if the opening rotation shaft (the guide shaft 18) is provided in a rear and/or upper portion of the inner case 2, the inner case 2 having rotated about the opening rotation shaft (the guide shaft 18) interferes with the outer case 1 or enters the inside of the outer case 1. Thus, in these cases, the inside of the outer case 1 is difficult to be sufficiently exposed.

During closing operation, the inner case 2 is rotated counterclockwise, the second link shaft 53 and the link engagement portion 60 are caused to engage with each other again. Then, the inner case 2 is mounted on the second link shaft 53. When the inner case 2 is pressed in a direction reverse to the direction during the opening operation, the inner case 2 operates to close. That is, the entirety of the inner case 2 moves forward by means of the slide mechanism, and at least the rear portion of the inner case 2 swings upward by means of the link mechanism. Then, the inner case 2 is disposed at the closed position shown in FIG. 9 again.

Also in the glove box of Embodiment 3, a large change in the center of gravity in the up-down direction of the inner case 2 can be suppressed, and the inner case 2 operates to close under a comparatively small force. That is, in the glove box of Embodiment 3, the inner case 2 is guided in the front-rear direction by the slide mechanism, and the rear portion of the inner case 2 is caused to swing downward by the link mechanism, whereby the inner case 2 can be caused to operate to open obliquely downward. If the inner case 2 is caused to operate to open obliquely downward, also in a case where the glove box of Embodiment 3 is assembled in the instrument panel having an inclined shape, for example, the storage space of the inner case 2 can be greatly exposed in the vehicle's cabin. Moreover, compared with a case where the entirety of the inner case 2 is caused to slide obliquely downward or in a case where the inner case 2 is caused to greatly swing, the amount of change in the center of gravity of the inner case 2 in the up-down direction can be reduced.

Further, in the glove box of Embodiment 3, the supporting point (the guide shaft 18) in the slide mechanism and the supporting points (the first link shaft 52 and the second link shaft 53) in the link mechanism are distanced from each other in the front, rear, and up directions of the inner case 2. Specifically, the position in the front-rear direction of the guide shaft 18 relative to the inner case 2 is provided further to the front side relative to the front-side ¼ position of the inner case 2. In addition, the position in the front-rear direction of the second link shaft 53 is provided to the rear side relative to the front-side ⅓ position of the inner case 2. With respect to the glove box of the present invention, it is considered that, when the distance between the second link shaft 53 and the guide shaft 18 is sufficiently large, the center of gravity of the inner case 2 can be disposed between the second link shaft 53 and the guide shaft 18, and thus, the inner case 2 operates to open/close in a stable manner. That is, when taking into consideration the operational stability of the inner case 2, it is preferable that the distance between the second link shaft 53 and the guide shaft 18 is large. In the glove box of Embodiment 3, the guide shaft 18 and the second link shaft 53 are greatly distanced from each other in the front-rear direction (that is, the guided direction of the inner case 2 by the slide mechanism described above). Accordingly, the inner case 2 slides and swings in a stable manner, and the force required in opening/closing the inner case 2 is reduced. For reference, preferably, the distance between the guide shaft 18 and the second link shaft 53 in the front-rear direction of the inner case 2 is not less than ½ of the entire length of the inner case 2 in the front-rear direction. Moreover, preferably, the center of gravity of the inner case 2 is at a position forward of the guide shaft 18.

In the glove box of Embodiment 3, the position of the guide shaft 18 in the up-down direction of the inner case 2 is provided further to the lower side relative to the lower-side ¼ position of the inner case 2. Accordingly, a comparatively large space is formed above the inner case 2, and the communication hole 12 is greatly exposed.

In Embodiment 3, the guide shaft 18 is provided in a front and upper portion of the inner case 2. However, it is sufficient that the position of the guide portion 18 is in a front portion of the inner case 2, and is not limited thereto. For example, the guide portion 18 may be provided in a front and lower portion of the inner case 2. In this case, it is sufficient that the slide guide portion 15 is provided at a position corresponding to the position of the guide portion 18.

Embodiment 4

Figure 13:
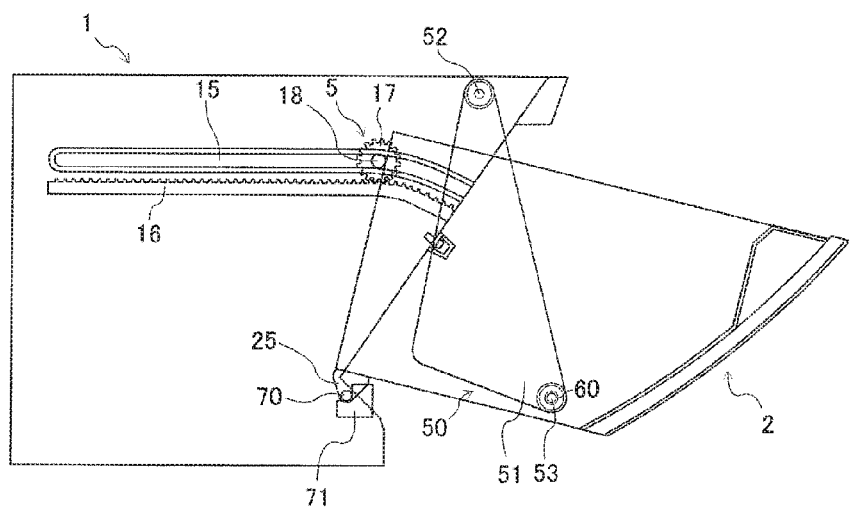
FIG. 13 is an explanatory drawing schematically showing the glove box of Embodiment 4 with the inner case at the open position.
Figure 14:
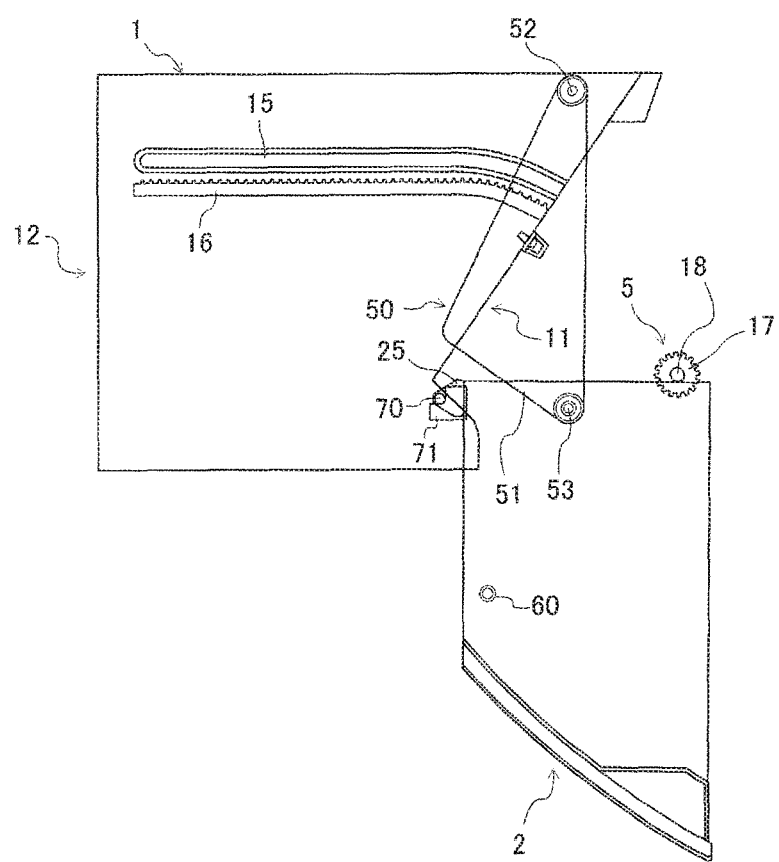
FIG. 14 is an explanatory drawing schematically showing the glove box of Embodiment 4 with the inner case rotated.

The glove box of Embodiment 4 is substantially the same as the glove box of Embodiment 3, except that an opening rotation shaft 70 different from the guide shaft 18 is provided, that a pivot portion 71 capable of pivotally supporting the opening rotation shaft 70 is provided in the outer case 1, that the guide shaft 18 is provided at the front and upper end of the inner case 2, and that the second guide portion 5 is provided in an upper portion of the outer case 1, and except the shape of the second guide portion. FIG. 12 to FIG. 14 each show an explanatory drawing schematically showing the glove box of Embodiment 4. Specifically, FIG. 12 shows the glove box with the inner case 2 at the closed position. FIG. 13 shows the glove box with the inner case 2 at the open position. FIG. 14 shows the glove box with the inner case 2 rotated.

In the glove box of Embodiment 4, the guide shaft 18 and the pinion portion 17 are provided at the rear and upper end of the inner case 2. The slide guide portion 15 guiding the guide shaft 18 and the rack portion 16 meshed with the pinion portion 17 are also provided in an upper portion of the outer case 1. It should be noted that a rear end portion of the slide guide portion 15 and a rear end portion of the rack portion 16 are downwardly curved in a substantially arc shape.

The opening rotation shaft 70 is provided in the inner case 2, separately from the guide shaft 18. Specifically, a shaft seat 25 is provided at the front and lower end of the inner case 2. The opening rotation shaft 70 is provided in the shaft seat 25 so as to protrude therefrom. Similarly to the opening rotation shaft (the guide shaft 18) of Embodiment 3, the opening rotation shaft 70 is provided further to the lower side relative to the lower-side ¼ position of the inner case 2.

The pivot portion 71 is provided on aside face of the outer case 1. The pivot portion 71 has a shaft receiving groove 72 capable of pivotally supporting the opening rotation shaft 70. The shaft receiving groove 72 is open forward and upward. At the closed-position shown in FIG. 12, the pivot portion 71 and the opening rotation shaft 70 are greatly distanced from each other in the front-rear direction. However, when the position of the inner case 2 is changed toward the open position, the opening rotation shaft 70 provided in the inner case 2 comes close to the pivot portion 71. Then, at the open position shown in FIG. 13, the opening rotation shaft 70 is pivotally supported by the pivot portion 71.

At this time, the inner case 2 can be dismounted from the second link shaft 53 with the same operation as in Embodiment 3. The inner case 2 having been dismounted from the second link shaft 53 is supported by the outer case 1 via the guide shaft 18 and the opening rotation shaft 70. That is, at this time, the guide shaft 18 is still supported by the slide guide portion 15, and the opening rotation shaft 70 is still pivotally supported by the pivot portion 71. As described above, the rear end portion of the slide guide portion 15 is curved in a substantially arc shape. Specifically, the rear end portion of the slide guide portion 15 is curved in an arc shape about the opening rotation shaft 70 supported by the pivot portion 71. Thus, at this time, the inner case 2 can rotate about the opening rotation shaft 70. In addition, the rear end portion of the slide guide portion 15 is open to the rear side. Thus, as shown in FIG. 14, when the inner case 2 rotates, the guide shaft 18 is dismounted from the slide guide portion 15, and the inner case 2 is supported by the outer case 1 (specifically, the pivot portion 71), only by means of the opening rotation shaft 70. Then, the inner case 2 is disposed to the lower side (more specifically, to the lower side relative to the entry hole 11) of the outer case 1, and the inside relative to the outer case 1 is exposed. Accordingly, also in the glove box of Embodiment 4, by further rotating the inner case 2 disposed at the open position, a vehicle component provided forward of the outer case 1 can be easily accessed.

In the glove box of Embodiment 4, at the closed position, the distance between the second link shaft 53 and the guide shaft 18 in the sliding direction of the inner case 2 is relevant to the operational stability of the inner case 2. On the other hand, at the open position, the distance between the opening rotation shaft 70 and the second link shaft 53 is relevant to the operational stability of the inner case 2. That is, in the glove box of Embodiment 4 where the inner case 2 is supported by the outer case 1 only by means of the opening rotation shaft 70 at the open position, it is preferable that both of the distance between the guide shaft 18 and the second link shaft 53 and the distance between the opening rotation shaft 70 and the second link shaft 53 are large. Specifically, the distance between the opening rotation shaft 70 and the second link shaft 53 is preferably not less than ½ of the entire length of the inner case 2 in the front-rear direction. In addition, the center of gravity of the inner case 2 is preferably to the front side relative to the second link shaft 53. The distance between the guide shaft 18 and the second link shaft 53 is the same as in Embodiment 3.

INDUSTRIAL APPLICABILITY

The glove box of the present invention can be preferably used as a glove box of various types of vehicles.

DESCRIPTION OF THE REFERENCE CHARACTERS

1: outer case
2: inner case
3: operation end portion
6: open/close urging element
7: open/close guide portion
8: lock body
9: lock urging element
10: constant force spring
11: entry hole
12: communication hole
15: slide guide portion
18: guide shaft
23: slide end portion
24: pivot end portion
29: lock region
50: link member
52: first link shaft
53: second link shaft
70: opening rotation shaft
71: pivot portion

The invention claimed is:
1. A glove box comprising:
an outer case in a box shape having an entry hole which is open rearward;
an inner case having therein a storage space which is open upward, the inner case configured to slide and swing between a closed position at which the inner case is accommodated in the outer case to close the entry hole, and an open position at which at least a part of the inner case is pulled out through the entry hole of the outer case to a rear and lower side relative to the outer case to open the entry hole;
a guide shaft provided in the inner case;
a slide guide portion provided in the outer case and configured to slidably and rotatably support the guide shaft to guide the inner case at least in a front-rear direction; and
a link member including a first link shaft axially supported by the outer case and a second link shaft axially supported by the inner case, the link member connecting the outer case and the inner case, wherein the guide shaft is provided in a front portion of the inner case, the first link shaft is provided in the outer case above the inner case, and the second link shaft is provided in a rear portion of the inner case.

2. The glove box according to claim 1, wherein
the outer case includes a communication hole which is open forward,
the second link shaft is axially supported by the inner case so as to be detachable therefrom, and
when the inner case is detached from the second link shaft at the open position, the inner case becomes rotatable about an opening rotation shaft provided in a front and lower portion of the inner case.

3. The glove box according to claim 1, wherein
a position of the guide shaft relative to the inner case is further to a front side relative to a front-side ¼ position of the inner case.

4. The glove box according to claim 1, wherein
a position of the second link shaft relative to the inner case is to a rear side relative to a front-side ⅓ position of the inner case.

5. The glove box according to claim 2, wherein
a position of the guide shaft relative to the inner case is further to a lower side relative to a lower-side ¼ position of the inner case.

6. The glove box according to claim 5, wherein
the opening rotation shaft is the guide shaft.

7. The glove box according to claim 2, wherein
the inner case includes the opening rotation shaft further to a lower side relative to a lower-side ¼ position of the inner case,
the outer case includes a pivot portion capable of coming into contact with the opening rotation shaft and configured to pivotally support the opening rotation shaft at the open position, and
at the open position, the inner case rotates about the opening rotation shaft pivotally supported by the pivot portion.

* * * * *